United States Patent
Scholl et al.

(10) Patent No.: US 7,594,244 B2
(45) Date of Patent: Sep. 22, 2009

(54) PROGRAM RECOMMENDATION SYSTEM

(75) Inventors: Holger R. Scholl, Herzogenrath (DE); Eric Thelen, Aachen (DE); Jan Kneissler, Aachen (DE); Andreas Kellner, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 365 days.

(21) Appl. No.: 10/578,648

(22) PCT Filed: Oct. 29, 2004

(86) PCT No.: PCT/IB2004/052241

§ 371 (c)(1),
(2), (4) Date: May 9, 2006

(87) PCT Pub. No.: WO2005/048601

PCT Pub. Date: May 26, 2005

(65) Prior Publication Data

US 2007/0044122 A1 Feb. 22, 2007

(30) Foreign Application Priority Data

Nov. 12, 2003 (EP) .................................. 03104158

(51) Int. Cl.
*H04N 5/445* (2006.01)
(52) U.S. Cl. ........................... 725/46; 725/47; 725/44; 725/39; 725/12; 725/9
(58) Field of Classification Search ................... 725/46, 725/12, 9, 47, 44, 39
See application file for complete search history.

(56) References Cited

U.S. PATENT DOCUMENTS 6,163,316 A 12/2000 Killian

*Primary Examiner*—Quynh H Nguyen

(57) ABSTRACT

A system and a method for program recommendation are described. In order to present a user a recommendation for a choice of audio or video content pieces broadcast consecutively at a plurality of different channels, (a) piece scores of content pieces are calculated, indicating a match of a corresponding content description with a profile, (b) and sequence scores are calculated for a plurality of sequences of content pieces, said sequence scores being based at least on said piece scores and on a correlation of content descriptions of at least two pieces contained in the sequence. A recommended sequence is chosen according to the sequence score. Preferably, one or, more preferred sequences are shown to the user in a lattice representation.

11 Claims, 5 Drawing Sheets

|  | 14:00 | 15:00 | 16:00 |
|---|---|---|---|
| Ch.1 | A1 | B1 | C1 |
| Ch. 2 | A2 | B2 | C2 |
| Ch. 3 | A3 | B3 | C3 |
| Ch. 4 | A4 | B4 | C4 |
| Ch. 5 | A5 | B5 | C5 |

| Content Piece | Piece Score |
|---|---|
| A1 | 27.6 |
| B1 | 31.5 |
| C1 | 15.3 |
| A2 | 22.4 |
| ... | ... |
| C5 | 19.9 |

FIG.3

| Path | Time | Content Pieces | Piece Scores | Path Score |
|---|---|---|---|---|
| #1 | 14:00 − 14:40<br>14:40 − 14:50<br>14:15 − 16:15<br>16:15 − 17:00 | A1<br>A2<br>B3<br>C2 | 27.6<br>22.4<br>18.0<br>26.3 | 174.3 |
| #2 | 14:00 − 15:20<br>15:20 − 16:00<br>16:00 − 17:00 | A5<br>B2<br>C4 | 17.3<br>21.1<br>18.6 | 131.0 |
| #3 | 14:00 − 14:35<br>14:35 − 16:00<br>16:00 − 17:00 | A3<br>B3<br>C5 | 27.6<br>22.4<br>19.9 | 162.9 |
| ... | ... | ... | ... | ... |

FIG.4

PROGRAM RECOMMENDATION SYSTEM

The invention relates to a system and a method for program recommendation.

For audio and video media, e.g. television and radio broadcast, electronic program guides (EPGs) are known. For example, in digital video broadcast (DVB), program content information is transmitted along with the pieces of content, which form the actual program. The program content information includes, for each of the different accessible channels, a broadcast time for content pieces and a content description thereof. The content description may be limited to the title only but may also include further information, such as a natural language description, or other categorised information such as the type or genre of the piece of content as well as additional information such as the author, artist or actor performing therein, etc.

Based on the available program information, recommendation systems have been proposed. Generally these recommendation systems rely on a user profile, which includes the users preferences. For program recommendation, the above mentioned program content information is accessed and the content description of content pieces is compared to the user profile.

An example of a corresponding recommender system is given in U.S. Pat. No. 6,163,316. Here, the recommender system is associated with a television set. A data base with program content information on a plurality of channels is accessed. The system includes storage means for storing a viewer profile. Selection means match the user profile against content descriptions in the program content information and generate a preferred schedule, which indicates the desirability of a particular program relative to other programs.

However, recommendation systems of the type discussed above are only oriented towards a single instant. If the user wishes to plan watching television for a specified time interval, which might involve several pieces of content, the known recommendation systems do not assist his choice appropriately.

Another issue in assisting the viewer to choose an audio or video program is the way the available content pieces are shown to the user. Here, a matrix-style appearance is widely used. In the matrix-style representation, available channels are shown as parallel horizontal rows where start and end times of content pieces are marked on a horizontal time axis. An example of this type of representation is given in U.S. Pat. No. 6,163,316, where content pieces are shown with coloured overlays indicating recommended programs.

A disadvantage of matrix-style per-channel representation is that only a very limited number of channels can be displayed in a clear and concise manner. Thus, channels where interesting content pieces are only shown occasionally (e.g. a local channel, where only the news are interesting to the user) will most likely not be part of the, say, 5 channels represented and therefore be invisible to the user.

Accordingly, it is the object of the invention to provide a recommendation system well suited to assist the user in choosing a program from several available content pieces.

This object is solved according to the invention by a system for program recommendation according to claim 1 and a method for program recommendation according to claim 13. Dependent claims relate to preferred embodiments of the invention.

As in known recommendation systems, the system according to the invention employs a profile and corresponding program content information on a plurality of channels. The profile is preferably a user profile for a single user or a group of users. Content pieces broadcast over the channels are matched against the user profile to determine a piece score. It is preferred that the content description comprises one or more of the following information of a content piece: Category with possible subcategories like e.g. genre, actor or artist, author, language, production year, country of origin, originating channel. It is preferred for the user profile to comprise preference values for one or more of the above information indicating the users preference. For example, a user profile may contain a preference value of 0.8 for a content piece of the category "sports", but only a preference value of 0.4 for the category "financial". The preference value is used to calculate a piece score of a particular piece of content.

As a central aspect of the invention however, the recommended program is not selected exclusively based on this piece score. Instead, sequences of content pieces are examined. These sequences cover a specified time interval and contain content pieces consecutively broadcast in this time interval. For a plurality of these sequences, a sequence score is calculated. The calculation of the sequence score is based on one hand on the piece scores of the individual pieces contained in the sequence, and on the other hand on correlation of the content descriptions of at least two content pieces in the sequence. The sequence score thus determined reflects the presumed desirability of the chosen program (sequence of content pieces) for the user.

By not only considering single pieces of content, but by determining a score for whole sequences thereof the finally selected recommendation is more suited to the user's interests. While a recommendation system solely based on piece scores will, for any given time, only recommend the content with the highest piece score, the recommendation system according to the invention may use correlation rules to determine a suggestion which, seen over the specified time period, is more likely to appeal to the user. This may be illustrated by a simple example: With the huge variety of television channels available, a TV recommendation system based on piece scores alone might, at any time during the day, propose to the user his favourite program. Thus, if the user is most interested in sports news, the prior art system may recommend to him a sequence entirely consisting of sports news on different channels, where the same events will be related time after time. By contrast, the recommendation system according to the invention may have a correlation rule penalising sequences with multiple occurrences of the same type of content. Thus, the recommendation selected here is likely to include a mixture of different features the user is interested in, with only a few sports news shows therein.

The sequences considered according to the invention contain content pieces consecutively broadcast in the time interval. While there may be pauses in this sequence, i.e. times for which know recommendation is given, it is generally preferred that the sequence covers the whole time interval. It is also possible that pauses are filled by inserting recorded content pieces, which have been previously stored. A sequence may include one or more content pieces only partly. For example, a sequence may include a content piece on a first channel for a certain time period, and then—after the end of the first content piece—switching into a second content piece on another channel, which has already been running for some time. Also, a sequence may include interrupting a first content piece by switching to another channel where a second content piece is presently starting. Generally, a sequence may also include a switch over from one running content piece into another. It is, however, preferred to select sequences such that the switch over time from a first to a second content piece corresponds to the end time of the first content piece and/or to the start time of the second content piece, so that intermediate switchovers (from running feature into running feature) are avoided.

For the calculation of the sequence score, there are a large number of different possibilities. It is, however, central to the invention, that the calculation be based on both the individual piece scores and correlation of pieces contained in the sequence. The calculation may involve, for example, calculating an average of piece scores of the pieces contained in the sequence and by then modifying (e.g. adding to or multiplying by) this value with one or more correlation values.

In a preferred embodiment, correlation of content descriptions of pieces in the sequences is judged according to one ore more correlation rules. These rules may be dependent on the user, and therefore be contained in the user profile. Each correlation rule contains instructions on how to calculate a correlation value. This correlation value is representative of a correlation of content descriptions of two pieces. An example of a correlation rule would be to calculate a negative correlation value for every pair of content pieces in the sequence which are of the same type, e.g. several news shows. The more occurrences of content pieces of common type are found, the more negative the correlation value becomes. The finally obtained correlation value would then, e.g. be added to the sum of piece scores to calculate the sequence score, so that a negative correlation value would lower than the overall score.

According to a development of the invention, it is preferred that the selection means are configured to calculate the sequence score such that it is lower if two or more content pieces in the sequence are of a common type, than if this is not the case. This serves to balance the sequence, so that a sequence with content pieces of different types is more likely to be selected. The corresponding (negative) correlation value may be dependent on the type of the content pieces, so that e.g. multiple occurrences of news shows are penalised more than multiple talk shows. According to another development of the invention, the sequence score is lower the more switchovers between content pieces are contained in the sequence. This rule favours completion of content pieces, rather than frequent changes.

As another possible way to obtain well "balanced" sequences, calculation of the sequence score may involve checking if content pieces of one or more preferred categories or types are present in the sequence at all. If this is not the case, the sequence score is lower.

As explained above, sequence scores are calculated for a number of sequences and, according to the obtained sequence score, at least one sequence is finally selected for recommendation. It is, of course, also possible to select more then one sequence, e.g. the best two or three sequences for selection by the user. In principle, it would be desirable to calculate the sequence score of every possible sequence that can be obtained from the content pieces of all accessible channels. Comparison of all sequence scores would then lead to an optimum sequence. However, with an increasing number of channels and available content pieces as well as a larger time interval, this optimisation problem may get very complex, because a vast number of possible sequences would have to be evaluated. Thus, to simplify the optimisation problem, it is possible to pre-select sequences based on pieces scores of the contained content pieces. A possible criteria here maybe the sum or average of all piece scores in a sequence, which is compared to a threshold. Only those sequences above the threshold will be pre-selected and further regarded in the optimisation (calculation of the sequence scores). Another possibility for pre-selecting sequences would be to provide a piece score threshold and not consider sequences that contain single content pieces with a piece score below this threshold.

Another object is to provide a graphical representation for a user which shows a number of recommended sequences in a clear and concise manner. This is archived, according to the development of the invention, by showing a plurality of recommended sequences (e.g. N-best) to the user in a lattice representation, where content pieces are represented as edges running between a start time and an end time on a time axis. Thus, contrary to known EPG representations, content pieces are not shown per channel, but as parts of the corresponding sequence.

According to a further development of the invention, a content piece contained in two or more display sequences is only represented as a single edge. This serves to show sequences to the user in a concise manner. From this type of representation, the user can easily recognise his choices between the different sequences presented.

In some cases, the same content piece may be comprised in a large number of high scoring sequences. It would then be possible, that for certain time intervals the user would not be shown any alternative. To prevent this, it is proposed according to a development of the invention to select the displayed sequences such that for each point in time at least two alternatives are presented. Thus, the selection of displayed sequences may not be exclusively based on sequence scores (N-best).

According to further developments of the invention, the user can change either the represented time interval or the shown sequences, or both. The user may input commands to scroll along the time axis. This scrolling may follow one specifically chosen path. Also, the user may scroll among represented sequences. If, for example, the N-best sequences are shown, the user may input a command to display further sequences with lower scores. In this case, it is preferred that, while showing lower ranking sequences instead of the higher ranking sequences, the top ranking path stays on the display for reference, e. g. on top.

In the following, examples of program recommendation systems according to the invention will be shown with a regard to figures, where FIG. 1 shows a diagram with content pieces of a first example in a lattice structure;

FIG. 3 shows a table of content pieces and piece scores in the first example;

FIG. 4 shows a table of paths in the lattice of FIG. 1 with associated content pieces, piece scores and path scores;

A person who wants to pick a TV or audio feature for consumption needs to make a quite complex decision, given the wealth of available content: On one hand, the user has personal preferences and prefers some audio or video content pieces (e.g. movies, tv shows, songs, radio shows etc.) over other content pieces. The corresponding decision is already not easy if a large number of content pieces are available at a given time. The decision gets even more complex if consumption needs to be planed for a certain time frame, instead of a specific moment.

In the following, a program recommendation system and method will be explained and a detail example will be given on how, for a specific available content and a specific user profile, a recommendation is obtained and presented.

The specific realisation of a device which implements the system or method may differ. For one, the method may be implemented as a computer program running on a stand alone computer or on several computers, e.g. as a client/server application, where a client and a server are connected over a computer network. The computer would include storage means, such as RAM memory, and optical or magnetic recording devices for storing data such as user profile and correlation rules. The computer will further need to access a source of program information, which may be provided e.g. over a computer network.

The program recommendation system may also be included in an audio or video device, such as a TV set, satellite receiver, radio etc., where the program finally selected may then be played.

Figures 1, 2:
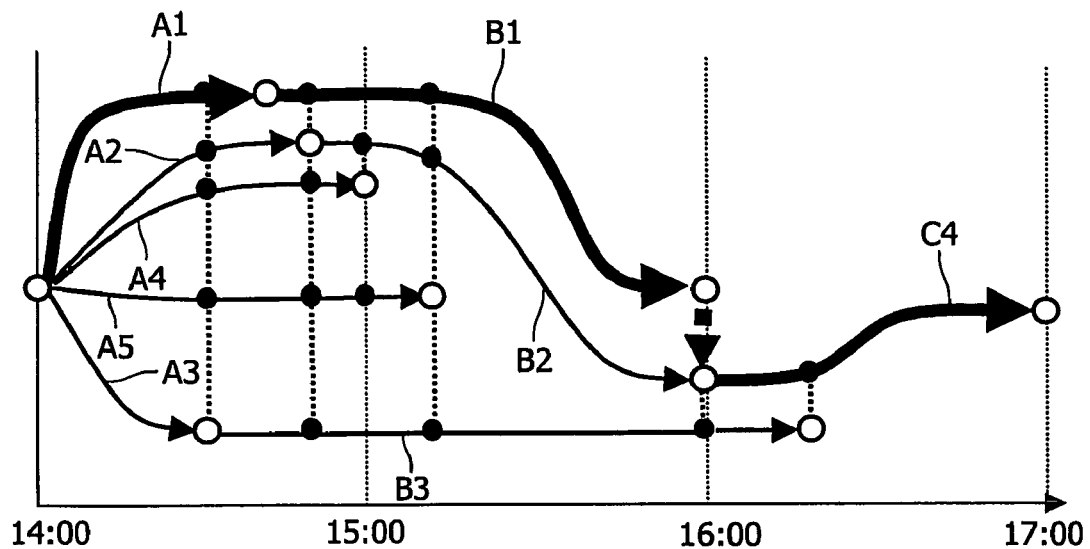
FIG. 2 shows a table with the available content pieces from the first example.

For TV and radio, electronic program guides (EPGs) are known. FIG. 2 shows as an example for five different channels a matrix-style EPG with the available content pieces per channel from 14.00 h-17.00 h. In the example, each of the available channels offers three content pieces in the regarded time interval.

Planning of consumption of a television program within this 3 hour interval will involve choosing an initial channel to watch, a first switch over at a first switch over time to switch to a second channel, a third switch over and so on. In the above example, even if intermediate switchovers (from running feature into running feature) are not taken into account, there are already 125 possible sequences of content pieces that may be viewed. Since in many cases today there is a much higher number of available channels, it is clear that the choice to make is even more complex.

The underlying problem may be developed into a lattice representation. A lattice is a connected graph, possibly along some fixed axis (e.g. time), with nodes and edges. In the present context, the nodes represent possible switchovers, while the content pieces (or parts thereof) are represented by the edges that connect two of the nodes.

It should be noted, that on the present context the idea of a lattice representation serves two purposes. The first purpose is the internal concept of organizing the content pieces in a connected manner, and of running evaluation algorithms to determine program recommendations. This internal concept will generally not be apparent to the user.

The second purpose is the concept of presenting the result of the optimisation to the user. The displayed graphical representation, which may also take a lattice form, will be described later.

FIG. 1 shows a lattice diagram as an internal organisation structure corresponding to the example of FIG. 2. In the representation of FIG. 1, the bullets represent possible switchovers, i.e. a change of content pieces (note, however, that viewing two consecutive content pieces of the same channel is treated as switchover, too). Solid black bullets designate switchovers where the corresponding content piece was not completed, circles designate switchovers where a content piece starts or ends. In FIG. 1, the edges have a label which gives a descriptor (program information such as title and channel). Within the lattice shown in FIG. 1, a plurality of paths may be found. Each path represents a sequence of content pieces and involves edges and nodes in the graph. In the example of FIG. 1, an example path is shown by a bold line. This path represents a viewing sequence, where from 14.00 h to 16.00 h the program of Ch. 1 (features A1, B1) is viewed, and then a switchover is effected to Ch. 4 to continue watching with feature C4.

In an example of a recommendation system recording to the invention, a user profile is stored giving personal preferences of the user with the regard to, e.g. involved artists, genre etc. This user profile may be time-dependent (e.g. a user likes to watch movies in the evening, but not during the day).

For each content piece, additional to channel number, start time and end time, content information is available. The content information may include the genre or type of the content piece, a natural language description of the content, names of artists, actors or author of a content piece etc.

To obtain a program recommendation that appeals to the user, in a first step a match of the content description against the user profile is effected to obtain a piece score for each individual content piece in FIGS. 1 and 2. The piece score reflects the users preference for the individual content piece.

An example of pieces scores for the content pieces of FIG. 2 is given in FIG. 3.

To find a recommendation for a sequence of content pieces that cover a certain time interval, a number of paths in the lattice of FIG. 1 are scored in a second step by calculating a path score (or sequence score). The path score means that not only single pieces of content, but complete sequences are evaluated.

The calculation of path scores depends on both the piece scores or the content pieces in the path and on a correlation of these content pieces.

This correlation can be scored according to a number of rules. These may be implemented similar to the "language model" used in speech recognition, that models the likelihood of word sequences and phrases. The rules may define a probability model, assigning conditional probabilities for certain pieces of content, given the predecessor in the sequence. For instance, if a sequence already contains a news show, later news shows will get a lower probability. As another example, a sequence containing documentary elements on a certain subject will receive a higher probability (higher score) for follow-ups or updates. It is also easily possible to incorporate models for transitions that interrupt a show (i.e. jump into it or jump out of it). Typically, such transition will have a lower probability than regular transitions, favouring the completion of programs.

Two important types of rules applied are "global" and "local" rules. Global rules examine whole sequences from start to end and award scores containing to the whole sequence. A global rule may, for example, check for completeness of a sequence, so that e.g. sequences are penalised if they do not contain at least one news show.

Other global rules may model a desired sequence structure by awarding scores according to the proportion of the content types of the different content pieces. For example, sequences with more than 60% sports, or such with more than 30% news may be penalised. Of course, these rules may be dependent on the user's preferences.

On the other hand, local rules do not examine whole sequences from start to end, but only pertain to a limited number of consecutive content pieces. For example, a local rule may be added to provide "smooth" transitions between content pieces i.e. transitions that appeal to the user. Such a local rule will only regard two consecutive content pieces and judge, if the transition is adequate. For example, in an audio program the transition rule will penalise "harsh" transitions (e.g. a hard rock song followed by a ballad) and award higher scores for smooth transitions. Such a local rule will be applied to all pairs of consecutive content pieces within a sequence.

Generally, a path score will be determined from a plurality of factors. The proportion, according to which each of the factors (piece scores, scores contributed by individual rules) is accounted for in the sequence score may be adjusted by weight factors. Some rules may be "must" rules, which are required to be fulfilled in a recommended sequence. Such "must" rules may be modelled by assigning a very high (infinitely high) penalty if the corresponding rule is not fulfilled.

The rules applied to determine a path score may be fixed as part of a recommendation system. It is, however preferred that at least the individual weight factors of the rules, and possibly also some rule definitions are part of the user profile. This will be especially be advisable for global rules (e.g. with desired content type distributions), which reflect the user's individual preferences.

The number of switchovers in the recommended sequence (i.e. longer content elements vs. shorter elements) can be modelled by a so-called "penalty". A penalty (negative score value) is awarded for each switchover. A low penalty value means that more and shorter elements are favoured; a high value leads to better scores for longer features.

For a number of paths in the lattice, path scores are calculated as described above. FIG. 4 is a table with an example of different paths, the corresponding piece scores and the finally obtained path scores. For example, path #1 contains content pieces A1, A2, B3, and C2, which each have a corresponding piece score. The whole sequence (path #1) is assigned a path score. The final recommendation is found according to the path score. In a preferred embodiment, the three sequences with the highest path score values are presented to the user for recommendation.

It should be noted that while it would generally be preferable to calculate path scores for all paths in the lattice, this may not be feasible if the number of possible paths becomes too large. Accordingly, in practical application in many cases only a part of all possible paths is completely evaluated.

Algorithms that perform a "beam" search within a huge network of possible alternative hypotheses originate in the fields of Graph Theory and Speech Processing. As the network of hypotheses ("lattice") might be far too large to expand, even dynamically, to its full extent, the expansion is limited to a "beam" of favourable hypotheses around the current best single hypothesis. This means that branches in the lattice that would lead to scores beyond a defined threshold are discarded and not followed further by the search ("score difference pruning"). Another means to restrict the size of the search lattice is to keep only a fixed number of favourable hypotheses and to dispose of all others ("histogram pruning"). It should be noted, that by any pruning method, it is possible to loose the path through the network that has the best score overall in the end. This kind of error is accordingly called pruning or search error, and should of course be minimized as far as possible.

As stated above, the concept of a lattice may not only be used as an internal concept, but can also be advantageously applied to the graphical representation shown to the user.

Figure 5:
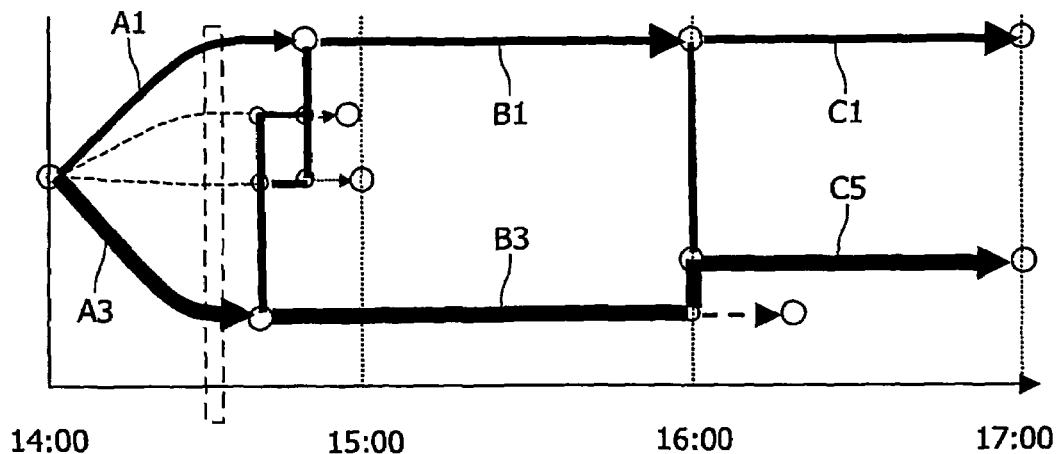
FIG. 5 shows a program recommendation for the first example presented in lattice form.

For a better overview, it is preferred to present the recommendation result to the user in a lattice representation. A corresponding example is given in FIG. 5. Here, the sequence with the highest scoring recommendation (A3, B3, C5) is highlighted.

Figure 6:
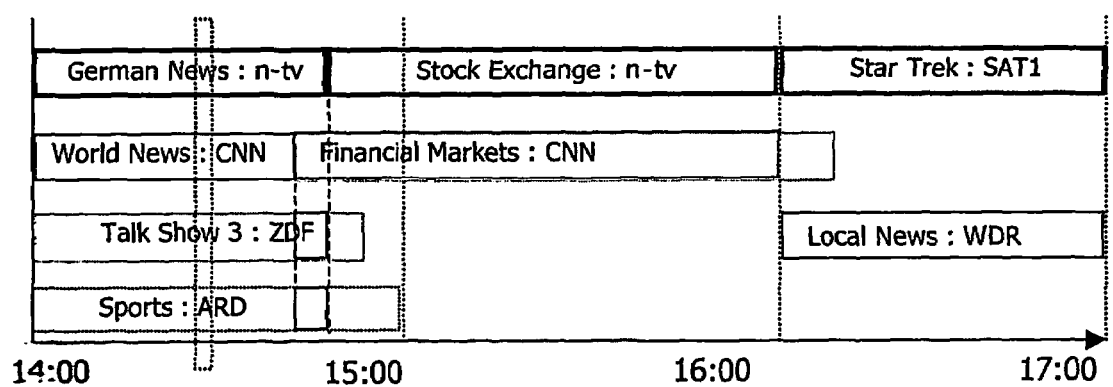
FIG. 6 shows a program recommendation presented in matrix-style form.

Another representation that may be shown to the user is given in FIG. 6. The graph shows the top-ranking sequences. Information on the type of content piece is included by displaying the different bars in correspondingly assigned colours or line styles. The graph shows the top-ranking sequences. In cases, where an alternative path differs only slightly, only the alternative segment is shown (in the example of FIG. 6, the features "talk show 3" and "sports" are alternative for the two top-ranking paths.

In the following, a simple example for program recommendation will be explained in detail.

The user profile in the example is given as numerical values attributed to different content categories. The program content information includes, for each content piece, one or more content categories out of a predetermined list. In the user profile, numerical values in the interval from 0 to 1 are given, where higher values indicate higher preference:

News: 0.7
   General: 0.7
   Financial: 0.6
   Information: 0.7
   Political: 0.8
   Other info-magazine: 0.6
Sci-Fi: 0.8
   Star-Trek: 0.5
   Star Wars: 0.9
Sports: 0.4
   Football: 0.8
   Car Racing: 0.1
Other: 0.5

The user profile in the example is organized hierarchical with categories and sub-categories. This should be interpreted in the following way:

The user is generally is interested in sports corresponding to a value of 0.4, however he is very interested in football (0.8), and not very interested in car racing (0.1). If none of the sub-categories apply, the category score is taken. If none of the categories apply, the score for the generic category "other" is taken.

In the example, the following content is available in the recommendation interval (17:00-20:00):

| Channel 1: | 17:00 News | 18:00 Info-Magazine | 19:00 Financial News |
|---|---|---|---|
| Channel 2: | 17:00 Star-Trek | 18:00 Ally McBeal | 19:00 Star Wars |
| Channel 3: | 17:00 Football | 18:00 Formula 1 | 19:00 Football |

These scores are determined by a match of the above user profile against the program content information. This leads to following piece scores:

| | |
|---|---|
| News | 0.7 |
| Info-Magazine | 0.6 |
| Financial News | 0.6 |
| Star-Trek | 0.5 |
| Ally McBeal | 0.5 |
| Star Wars | 0.9 |
| Football | 0.8 |
| Formula 1 | 0.1 |
| Football | 0.8 |

As described above, a lattice is determined from the available content. The lattice includes nodes (corresponding to start, end and switchovers) and edges interconnecting the nodes (corresponding to content pieces). The corresponding "pruned" (scored) lattice is given in FIG. 7.

Figure 7:
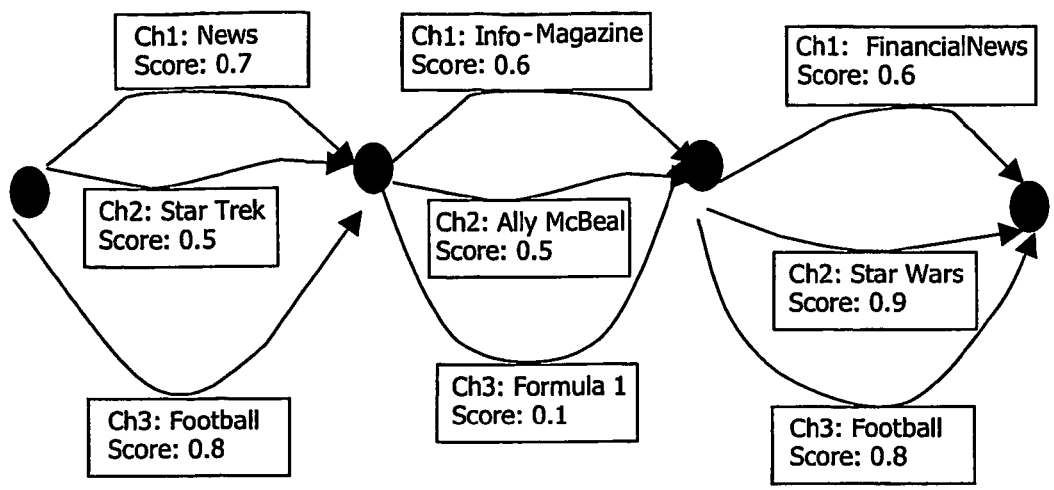
FIG. 7 shows a diagram representing content pieces of a second example in a lattice structure.

In the lattice of FIG. 7 all possible sequences (paths) are evaluated. In total, there are 27 possible paths in the lattice:

[Ch1, Ch1, Ch1], [Ch1, Ch1, Ch2], [Ch1, Ch1, Ch3]
[Ch1, Ch2, Ch1], [Ch1, Ch2, Ch2], [Ch1, Ch2, Ch3]
[Ch1, Ch3, Ch1], [Ch1, Ch3, Ch1], [Ch1, Ch3, Ch1]
[Ch2, Ch1, Ch1], [Ch2, Ch1, Ch2], [Ch2, Ch1, Ch3]
...
[Ch3, Ch3, Ch1], [Ch3, Ch3, Ch2], [Ch3, Ch3, Ch3]

For these sequences, sequence scores are calculated. The calculation of a sequence score is based on the pieces scores of the individual content pieces and on a number of rules.

A first set of rules models correlation of the content descriptions of content pieces in the sequence. In the example, these rules are given as "negative rules" where penalties are given for unwanted sequences. The simple rule set given below models a "bigram", i.e. only a sequence of two subsequent categories is taken into account. A full grammar typically will model complete paths:

| 1. | Info | Info | −0.2 |
| --- | --- | --- | --- |
| 2. | News | Info | −0.1 |
| 3. | Info | News | 0.0 |
| 4. | News | News | −0.3 |
| 5. | SciFi | SciFi | 0.0 |
| 6. | Sports | Sports | −0.1 |
| 7. | Other | Other | −0.3 |

Additionally, general penalty rules are applied to each paths:

| 8. | No news at all penalty: | −0.3 |
| --- | --- | --- |
| 9. | No SciFi at all penalty: | −0.1 |

For calculating path scores, first the sum of the individual pieces scores is taken (note, that this is only possible in the given example, because each sequence contains three content pieces. In a real application, an average score would be better, because otherwise sequences with more content pieces would automatically obtain higher scores).

For the paths in the present lattice, this leads to the following intermediate values:

| [Ch1: GenNews: 0.7, | Ch1: Info: 0.6, | Ch1: FinNews: 0.6] | total: 1.9 |
| --- | --- | --- | --- |
| [Ch1: GenNews: 0.7, | Ch1: Info: 0.6, | Ch2: StarWars: 0.9] | total: 2.2 |
| [Ch1: GenNews: 0.7, | Ch1: Info: 0.6, | Ch3: Football: 0.8] | total: 2.1 |
| ... | | | |
| [Ch2: StarTrek: 0.5, | Ch3: Form1: 0.1, | Ch1: FinNews: 0.6] | total: 1.2 |
| [Ch2: StarTrek: 0.5, | Ch2: Ally: 0.5, | Ch2: StarWars: 0.9] | total: 1.9 |
| [Ch2: StarTrek: 0.5, | Ch1: Info: 0.6, | Ch3: Football: 0.8] | total: 1.9 |
| ... | | | |
| [Ch3: Football: 0.8, | Ch1: Info: 0.6, | Ch2: StarWars 0.9] | total: 2.3 |
| ... | | | |
| [Ch3: Football: 0.8, | Ch3: Form1: 0.1, | Ch1: FinNews: 0.6] | total: 1.5 |
| [Ch3: Football: 0.8, | Ch3: Form1: 0.1, | Ch2: StarWars: 0.9] | total: 1.8 |
| [Ch3: Football: 0.8, | Ch3: Form1: 0.1, | Ch3: Football: 0.8] | total: 1.7 |

Next, for all sequences, the path scoring rules 1.-9. are applied:

| [Ch1: GenNews: 0.7, | Ch1: Info: 0.6, | Ch1: | total: |
| --- | --- | --- | --- |
| Rules that apply: 2, 3, 9 | Resulting in: −0.2 | FinNews: 0.6] | 1.7 |
| [Ch1: GenNews: 0.7, | Ch1: Info: 0.6, | Ch2: | total: |
| Rules that apply: 2 | Resulting in: −0.1 | StarWars: 0.9] | 2.1 |
| [Ch1: GenNews: 0.7, | Ch1: Info: 0.6, | Ch3: | total: |
| Rules that apply: 2, 9 | Resulting in: −0.2 | Football: 0.8] | 1.9 |
| ... | | | |
| [Ch2: StarTrek: 0.5, | Ch3: Form1: 0.1, | Ch1: | total: |
| Rules that apply: | Resulting in: 0.0 | FinNews: 0.6] | 1.2 |
| [Ch2: StarTrek: 0.5, | Ch2: Ally: 0.5, | Ch2: | total: |
| Rules that apply: 8 | Resulting in: −0.3 | StarWars: 0.9] | 1.6 |
| [Ch2: StarTrek: 0.5, | Ch1: Info: 0.6, | Ch3: | total: |
| Rules that apply: 8 | Resulting in: −0.3 | Football: 0.8] | 1.6 |
| ... | | | |
| [Ch3: Football: 0.8, | Ch1: Info: 0.6, | Ch2: | total: |
| Rules that apply: 8 | Resulting in: −0.3 | StarWars: 0.9] | 2.0 |
| ... | | | |
| [Ch3: Football: 0.8, | Ch3: Form1: 0.1, | Ch1: | total: |
| Rules that apply: 6, 9 | Resulting in: −0.2 | FinNews: 0.6] | 1.3 |
| [Ch3: Football: 0.8, | Ch3: Form1: 0.1, | Ch2: | total: |
| Rules that apply: 6, 8 | Resulting in: −0.2 | StarWars: 0.9] | 1.6 |
| [Ch3: Football: 0.8, | Ch3: Form1: 0.1, | Ch3: | total: |
| Rules that apply: 6, 6, 8, 9 | Resulting in: −0.6 | Football: 0.8] | 1.1 |

This leads to the following highest scoring sequences:
1. [Ch1, Ch1, Ch2]: 2.1
2. [Ch3, Ch1, Ch2]: 2.0
3. [Ch1, Ch1, Ch3]: 1.9

Here, the application of the path scoring rules leads to a highest score for the alternative [Ch1, Ch1, Ch2], with a path score of 2.1. Note, that by calculating only the sum of piece scores, the highest scoring alternative was [Ch3, Ch1, Ch2] with a total piece score of 2.3.

Figure 8:
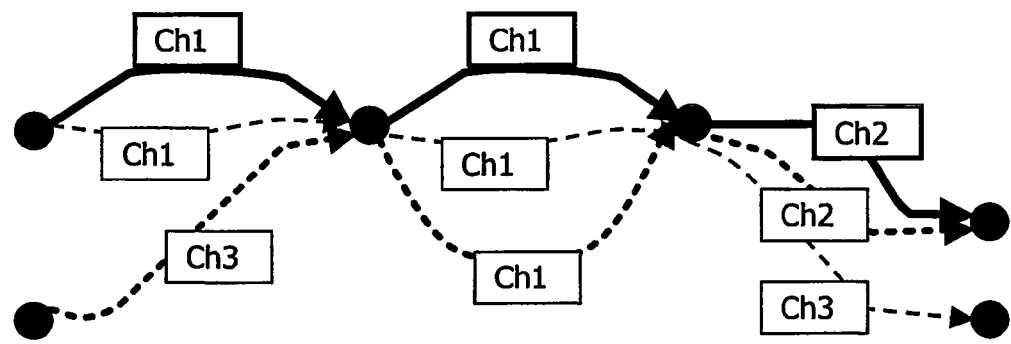
FIG. 8 shows a lattice diagram with possible sequences of the second example represented as paths.

FIG. 8 shows the three highest scoring paths in an internal lattice representation.

Figure 9:
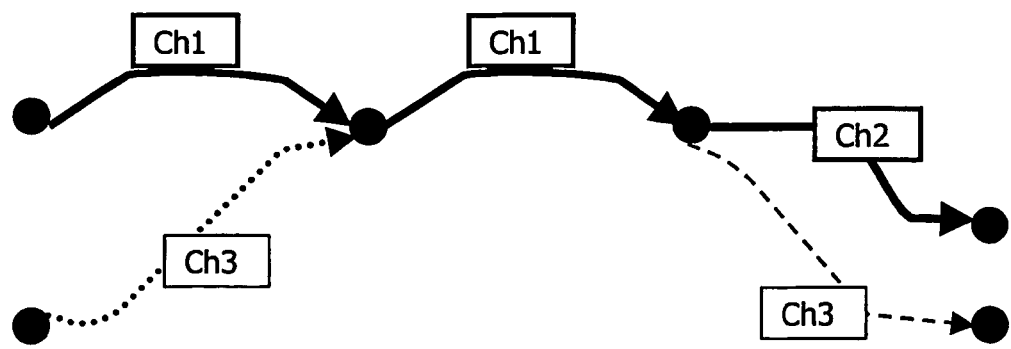
FIG. 9 shows a program recommendation for the second example presented in a first embodiment of a lattice form.

FIG. 9 shows a preferred graphical representation to present the recommendation to the user. Note, that here content pieces common to the displayed sequences are represented only once.

The highest scoring path is shown in a solid, bold line, whereas the nextcoming two paths are shown in dotted and slashed lines. On a coloured display, the paths could alternatively shown in different colours.

Figure 10:
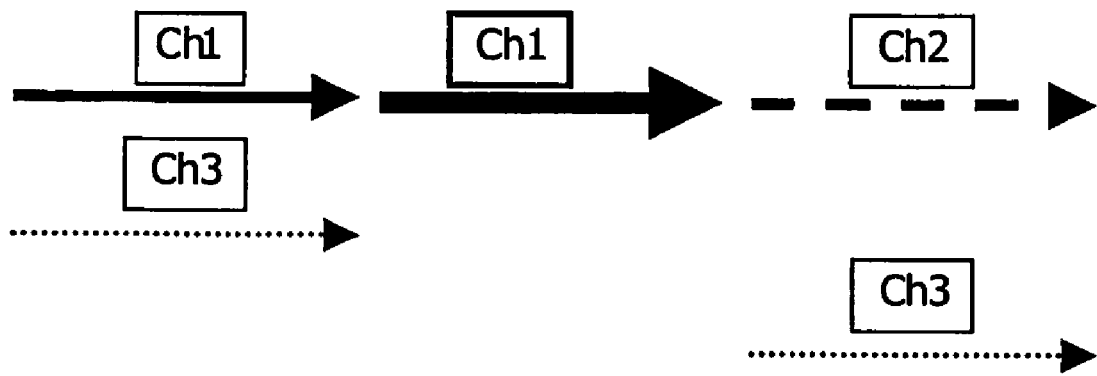
FIG. 10 shows a program recommendation for the second example presented in a second embodiment of a lattice form.

FIG. 10 shows an alternative display, which could be used to present the above recommendation to a user. Here, linetypes (alternatively: colours) correspond to channels.

The given representations may be scrolled by the user horizontally (to view how the sequences continue in time) or vertically (to look at further sequences, that where not among the initially presented N-best sequences). In case of vertical scrolling, it is preferred that the top scoring path stays on the display.

Additionally to the above-mentioned examples, a number of modifications can be incorporated in the recommendation system.

As one example, the actual current viewing or listening history of the user can be incorporated into the recommendation for the future. For example, if the user already consumed a news update in the last hour before the recommendation is established, sequences including further news updates will received a lower recommendation probability. This can be archived by using the current path of consumed content elements as starting piece for all future paths. The content sequence model can then incorporate the actual history into the probabilities for the ongoing parts of the path.

The further modification concerns the user profile. A general (e.g. broad audio viewing) profile can be combined (i.e. interpolated) with a user's specific profile. Similarly, if a recommendation for a group of people is needed, several user profiles may be combined.

Another modification concerns the content pieces. While in the above example only live content (i.e. content pieces that were viewed at the same time they are broadcasted) was considered, the recommendation may also include content pieces from other sources, such as recorded content pieces that are stored in a local or remote accessible memory and may be played at any time. For recorded content, the original viewing time and the number of times the content has been already played will preferably be considered in determining a piece score.

Other possible modifications concern the user's interaction with the recommendation system. While basically the recommendation system may work without any user interaction (i.e. the system simply displays the N-best sequences) it is preferred that the user may interact with the system. For example, the user may review the recommendation and expressly eliminate certain content pieces contained in the recommendation (i.e. a movie he already knows). In addition or alternatively the user may specifically include one or more content pieces. The system may then perform a re-evaluation of possible sequences without the eliminated content pieces, and including the chosen content pieces and present the result to the user.

Another user interaction generally required will be to enter the time period for which he wishes to obtain a recommendation.

Further modification may concern the choice of sequences finally presented to the user. While it is generally preferred to show the highest scoring sequences (N-best), further requirements may be provided. In the example given in FIGS. 9 and 10, all three presented paths have a common content piece (Ch. 1). For the corresponding time interval, the display does not present the user any alternative. To leave the user a choice, the system may instead of displaying the three highest scoring paths, display three paths such that the highest scoring path is included, but that for any time interval at least two alternatives are given.

The invention claimed is:

1. System for program recommendation, comprising:
a tangible computer storage encoded with computer executable instructions when executed comprise:
accessing means for accessing program information, where said program information comprises for a plurality of broadcast channels where content pieces are broadcast, a broadcast time of said content pieces and a content description of said content pieces; and
selection means for selecting pieces of content within a time interval, said selection means being configured to calculate for a plurality of content pieces a piece score by matching the content description with a profile, determine a plurality of sequences of content pieces, where said content pieces in said sequence are broadcast consecutively at said channels, where said selection means are configured to calculate said sequence score according to one or more rules, where according to each rule a correlation value representative of a correlation of the content description of at least two of the pieces contained in said sequence is calculated, calculating for said sequences a sequence score, based at least on said piece scores of the pieces contained in said sequence and on said correlation values of the content descriptions of at least two of the pieces contained in said sequence and selecting at least one of said sequences according to said sequence score, where said selection means are configured to select said sequences such that each switchover time from a first content piece of said sequence to a second content piece following said first content piece within said sequence corresponds to the end time of the first content piece and/or to the start time of the second content piece.

2. System according to claim 1, where said selection means are configured to calculate said path score such that it is lower, if two or more content pieces in a sequence are of a common type.

3. System according to claim 1, where said selection means are configured to calculate said path score such that it is lower the more switchovers from a first content piece of said sequence to a second content piece following said first content piece are contained in a sequence.

4. System according to claim 1, where said selection means are configured to calculate said path score such that is lower if the sequence does not contain content pieces of a predetermined type.

5. System according to claim 1, where said selection means are configured to pre-select a number of sequences based on the piece scores of the content pieces of said sequences, and calculate path scores only for the pre-selected sequences.

6. System for program recommendation, comprising:
a tangible computer storage encoded with computer executable instructions when executed comprise:
accessing means for accessing program information, where said program information comprises for a plurality of broadcast channels where content pieces are broadcast, a broadcast time of said content pieces and a content description of said content pieces; and
selection means for selecting pieces of content within a time interval, said selection means being configured to calculate for a plurality of content pieces a piece score by matching the content description with a profile, determine a plurality of sequences of content pieces, where said content pieces in said sequence are broadcast consecutively at said channels, calculating for said sequences a sequence score, based at least on said piece scores of the pieces contained in said sequence and on a correlation of the content descriptions of at least two of the pieces contained in said sequence and selecting at least one of said sequences according to said sequence score, where a number of sequences is shown to the user in a lattice representation, where content pieces are represented as edges running between start time and an end time on a time axis.

7. System according to claim 6, where a content piece contained in two or more displayed sequences is only represented as a single edge.

8. System according to claim 6, where sequences are shown such that at each point in time at least two alternatives are contained.

9. System according to claim 6, where a plurality of sequences is shown, which corresponds to the sequences with the highest sequence scores, where responsive to user input, further sequences with lower-scores are shown.

10. System according to claim 6, where a first time interval on said time axis is shown, where responsive to user input, a different, second time interval is shown.

11. A Method for program recommendation, said method executed by one or more computers and including the steps of:
(a) accessing program information, where said program information comprises for a plurality of broadcast channels, a broadcast time of content pieces broadcast at said channels and a content description of said content pieces;

(b) calculating for a plurality of content pieces a piece score, said piece score indicating a match of said content description with a profile;

(c) determining a plurality of sequences of content pieces, where said content pieces contained in said sequences are broadcast consecutively at said channels;

(d) calculating for said sequences a sequence score according to one or more rules, where according to each rule a correlation value representative of a correlation of the content description of at least two of the pieces contained in said sequence is calculated, based at least on said pieces scores of pieces contained in said sequence and on said correlation value of the content descriptions of at least two of the pieces contained in said sequence;

(e) and selecting at least one of said sequences according to said sequence score and in a manner such that each switchover time from a first content piece of said sequence to a second content piece following said first content piece within said sequence corresponds to the end time of the first content piece and/or to the start time of the second content piece.

* * * * *